United States Patent [19]

Janusas

[11] Patent Number: 5,777,572
[45] Date of Patent: Jul. 7, 1998

[54] DEVICE FOR DAMAGING ELECTRONIC EQUIPMENT USING UNFOCUSSED HIGH POWER MILLIMETER WAVE BEAMS

[75] Inventor: Saulius Janusas, Sea Cliff, N.Y.

[73] Assignee: Northrop Grumman Corporation, Los Angeles, Calif.

[21] Appl. No.: 662,813

[22] Filed: Jun. 12, 1996

Related U.S. Application Data

[63] Continuation of Ser. No. 277,238, Jul. 19, 1994, abandoned.
[51] Int. Cl.$^6$ ............................................. G01S 7/38
[52] U.S. Cl. ........................... 342/13; 342/14; 315/4; 331/79; 343/781 CA
[58] Field of Search ....................... 315/4, 5; 331/79; 342/13, 14; 455/1; 343/781 P, 781 CA

[56] References Cited

U.S. PATENT DOCUMENTS

| | | | |
|---|---|---|---|
| 4,189,660 | 2/1980 | Dandl | 315/5 X |
| 4,456,912 | 6/1984 | Ensley | 342/13 |
| 4,553,068 | 11/1985 | Brandt | 331/79 X |
| 4,636,689 | 1/1987 | Mourier | 315/4 |
| 4,733,133 | 3/1988 | Dandl | 315/4 X |
| 4,890,109 | 12/1989 | Gayliardi | 342/14 |
| 4,959,559 | 9/1990 | Ziolkowski | 327/39 X |
| 5,112,482 | 5/1992 | Stallard et al. | 315/5 X |
| 5,192,827 | 3/1993 | Jasper, Jr. | 342/14 X |
| 5,302,962 | 4/1994 | Rebuffi et al. | 343/781 P |

*Primary Examiner*—Benny T. Lee
*Attorney, Agent, or Firm*—Terry J. Anderson; Karl J. Hoch, Jr.

[57] ABSTRACT

A device for damaging electronic equipment has a millimeter wave generator, such as a gyrotron oscillator, for producing very high power millimeter waves. A beam former antenna forms the millimeter waves into narrow beams for distance transmission. An antenna coupled to the gyrotron directs narrow beams of the millimeter waves to selected targets, whereby the beams damage electronic equipment at the targets. The millimeter wave generator produces frequencies ranging from about 100 to 140 GHz at 20 millisecond megawatt pulses at 400 kilowatts CW.

16 Claims, 2 Drawing Sheets

Fig. 3

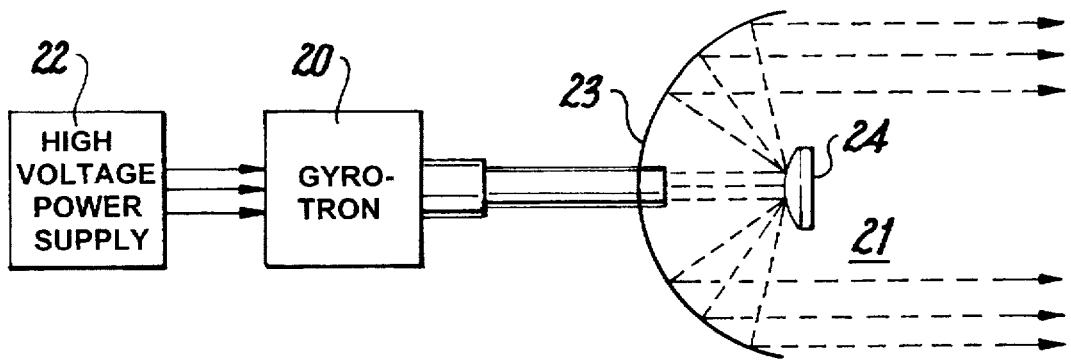

Fig. 4

| Characteristics | Implications |
|---|---|
| 1. Large area for beam and microwave circuit - 100 times area in klystron or conventional TWT | 100 times power output of conventional tubes |
| 2. Applied magnetic field proportional to frequency | Superconducting magnets for 60 GHz or higher |

Fig. 5

| High-Power Pulsed and CW Gyrotons | | | | | |
|---|---|---|---|---|---|
| Frequency GHz | Pulse Type | Power kW | Pulse Length ms | CW Type | Power kW |
| 8 | VGH-8001 | 500 | 1000 | | |
| 28 | VGA-8050 | 200 | 75 | VGA-8000 | 200 |
| 35 | | | | VGA-8003 | 200 |
| 53 | VGE-8053 | 200 | 100 | VGE-8005A2 | 200 |
| 56 | | | | VGE-8005 | 200 |
| 60 | VGE-8060 | 200 | 100 | VGE-8006 | 200 |
| 70 | VGF-8070 | 200 | 100 | VGE-8007 | 200 |
| 106 | VGB-8106A1 | 400 | 100 | | |
| 106 | VGB-8063 | 100 | 100 | | |
| 140 | VGT-8014 | 200/150 | 1/100 | VGT-8014 | 100 |
| 250 | VGT-8025 | 25 | 100 | | |

DEVICE FOR DAMAGING ELECTRONIC EQUIPMENT USING UNFOCUSSED HIGH POWER MILLIMETER WAVE BEAMS

This is a continuation of application Ser. No. 08/277,238 filed on Jul. 19, 1994 now abandoned.

BACKGROUND OF THE INVENTION

1. Field of the Invention

The present invention relates to a device for damaging electronic equipment. More particularly, the invention relates to a device which uses a very high power millimeter wave RF beam to damage electronic equipment.

2. Description of the Prior Art

In this age of high technology, we are highly dependent upon electronics in our industrial, commercial and military systems and devices. A powerful weapon for use by industrial and governmental forces would be one which damages or disables electronic equipment.

Recent developments in very high power millimeter wave gyro devices make it feasible to produce millimeter wave beams capable not only of jamming, but actually damaging electronic equipment. The gyro device can be either pulsed or operated in CW mode. The Varian Company is a leader in this technology, and has a development program for the International Thermonuclear Experimental Reactor (ITER) and the Compact Ignition Tokamak (CIT) to develop gyrotrons in the frequency range from 100 to 300 GHz with output power capabilities of one megawatt CW. Experimental units so far developed at 100 to 140 GHz produce 20 ms megawatt pulses and 400 kilowatts CW.

These gyrotrons have been employed in heating of magnetically confined plasmas at electron cyclotron resonance (ECR) frequencies in a variety of fusion experiments. ECR experiments reveal that millimeter wave power levels of 10 to 100 megawatts are needed to "ignite" a fusion reactor.

Varian gyrotrons use $TE_{15,2,1}$ interaction cavities. Short pulse output power levels of 1040 KW with efficiencies of 38% have been demonstrated.

Most previous tubes were designed to generate output power in the $TE_{on}$ (circular class waveguide) mode. The new design tubes use $TE_{mn}$ whispering-gallery modes, where m>>n. In contrast to circular electric modes, energy stored in a "whispering-gallery" mode is concentrated near the walls of the cavity, thereby requiring a larger diameter electron beam for efficient electron interaction. Tubes of this design have relatively large output windows. They are typically 3.5 inches in diameter double disc type and can function at the temperatures and stresses associated with the very high RF power levels. Researchers in this field have not yet fully solved the problem of separating the spent electron beam from the RF beam.

The gyrotron oscillators are smaller than klystrons or TWT's delivering the same RF power. They require high voltages of the order of 80 to 100 kilovolts and currents up to 25 amperes (2.5 MW). Using today's conservative power supply technology at 3 watts per cubic inch of space, the power supply would require a volume of about 840,000 cubic inches. This translates into a cube having 8-foot sides. If the pulse mode is used with a 10% duty cycle, the volume of the power supply would be reduced by 10 times. Containing such high voltages in small volumes is not as difficult as may first appear. Thus, for example, electric power companies routinely and reliably handle much higher voltages and powers. Using oil immersion high voltage technology, it is possible to engineer a practical millimeter wave weapon similar in size to a high power television transmitter or a radar modulator.

OBJECTS OF THE INVENTION

The principal object of the invention is to provide a device for damaging or disabling electronic equipment.

An object of the invention is to provide a device of simple structure for damaging or disabling electronic equipment.

Another object of the invention is to provide a compact device of small dimensions for damaging or disabling electronic equipment.

Still another object of the invention is to provide a portable device for damaging or disabling electronic equipment.

Yet another object of the invention is to provide a device for damaging or disabling electronic equipment essentially instantaneously.

Another object of the invention is to provide a device for damaging or disabling electronic equipment efficiently, effectively and reliably.

Still another object of the invention is to provide a device for damaging or disabling electronic equipment with minimal danger to operating personnel.

BRIEF SUMMARY OF THE INVENTION

In accordance with the invention, a device for producing very high power millimeter wave beams comprises millimeter wave generating means for producing RF power. Beam forming means forms the RF power into narrow beams for distance transmission. Antenna means coupled to the beam forming means selectively directs narrow beams of the RF power.

The millimeter wave generating means comprises a gyrotron oscillator and the beam forming means is incorporated in the gyrotron oscillator.

In accordance with the invention, a device for damaging electronic equipment comprises a millimeter wave generator for producing very high power millimeter waves. Beam forming means forms the millimeter waves into narrow beams for distance transmission. Antenna means coupled to the beam forming means directs narrow beams of the millimeter waves to selected targets, whereby the beams damage electronic equipment at the targets.

The millimeter wave generator comprises a gyrotron oscillator. The beam forming means is incorporated in the gyrotron oscillator. The gyrotron oscillator produces millimeter waves at frequencies ranging from about 100 to 140 GHz, at 20 millisecond megawatt pulses. The gyrotron oscillator produces 400 kilowatts CW.

In accordance with the invention, a method of damaging electronic equipment comprises the steps of producing very high power millimeter waves, forming the millimeter waves into narrow beams for distance transmission, and directing narrow beams of the millimeter waves to selected targets, whereby the beams damage electronic equipment at the targets.

At longer ranges, where the damaging energy falls off, the device of the invention can be employed as a very high power radar, communications and electronic equipment jammer which does not permanently damage such equipment.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, similar reference characters denote similar elements throughout the several views:

FIG. 3 is a schematic block diagram of the embodiment of FIG. 1;

FIG. 4 is a table showing characteristics of gyrotrons; and

FIG. 5 is a table showing characteristics of high power pulsed and CW gyrotrons.

DETAILED DESCRIPTION OF PREFERRED EMBODIMENTS

Figure 1:
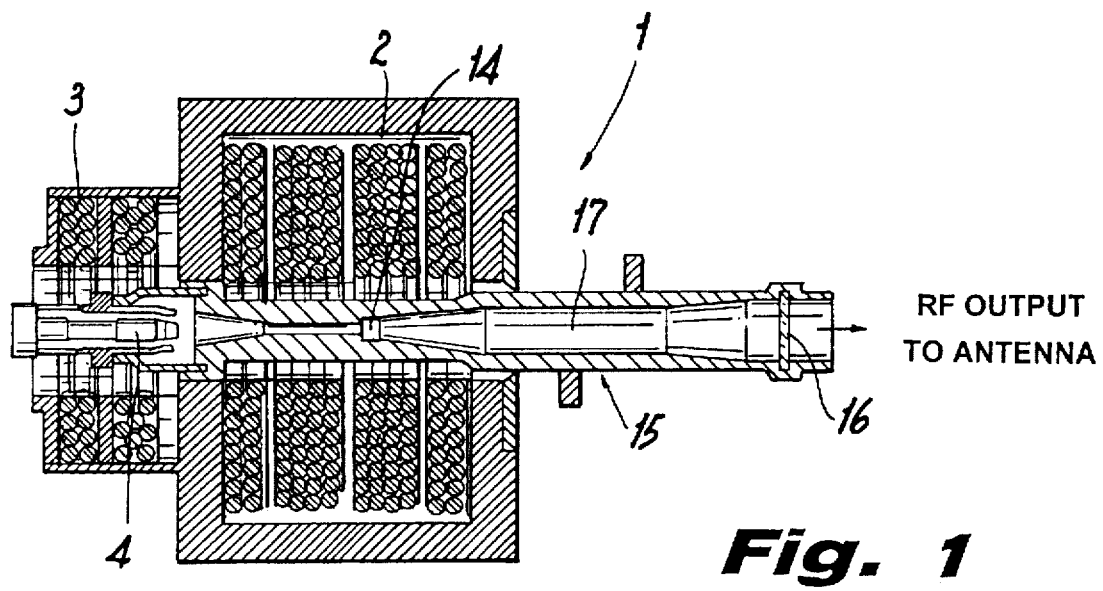
FIG. 1 is a schematic diagram, partly in section, of an embodiment of the device of the invention for damaging electronic equipment.
Figure 2:
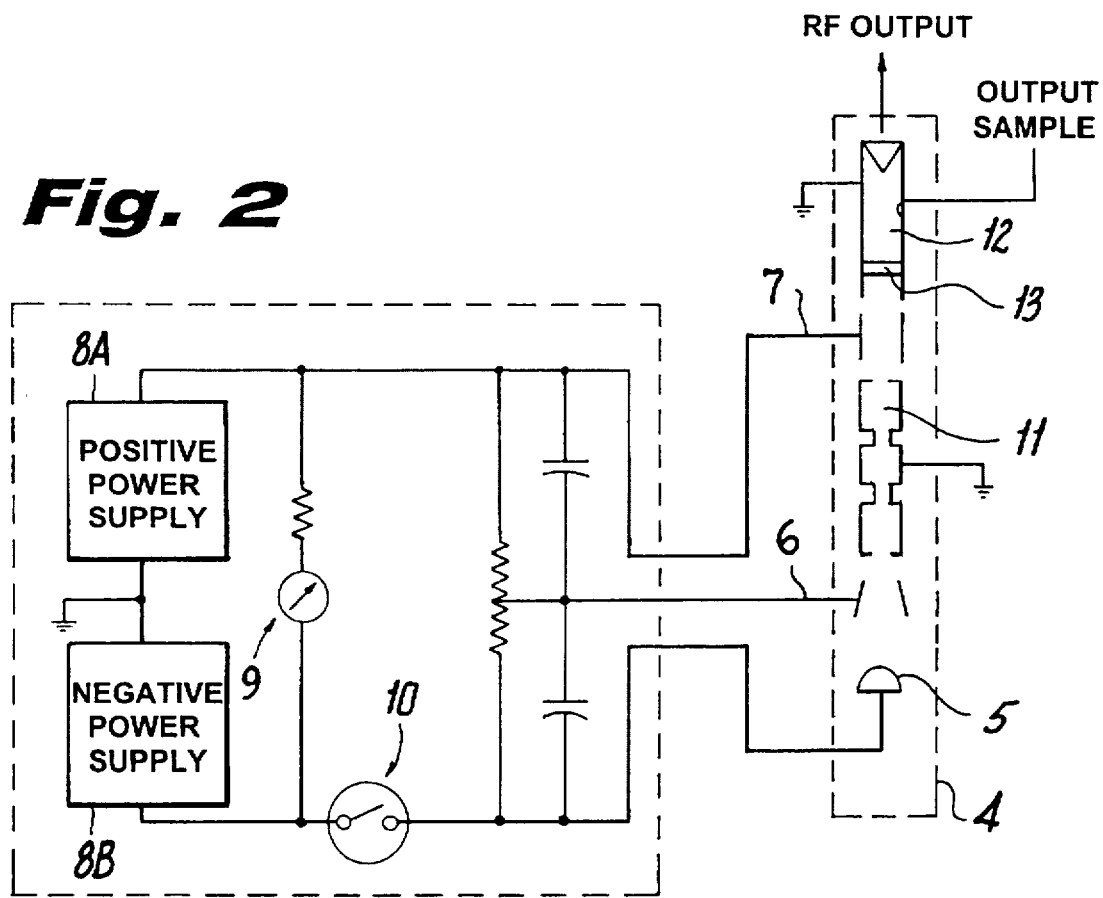
FIG. 2 is a circuit diagram of the embodiment of FIG. 1.

The device of the invention for damaging electronic equipment is shown in FIGS. 1, 2 and 3. As shown in FIG. 1, a millimeter wave generator 1 of any suitable known gyrotron oscillator produces very high power millimeter waves. Thus, as shown in FIG. 1, the wave generator or gyrotron 1 has main magnet coils 2, a gun magnet coil 3 and an electron gun 4 which are constructed in the usual manner and function in the usual manner. The electron gun, as shown in FIG. 1, is shown in more specific detail in FIG. 2. The electron gun includes a cathode 5, an anode 6 and a collector 7 energized by a power supply 8A, 8B via high voltage electrical connection lines HV, and a control switch 10. Meter 9 is used to monitor the voltage of the power supply. A body 11 is interposed between the anode 6 and the collector 7 (FIG. 2) and an output waveguide 12 having a window 13 is provided at the output of the collector.

In accordance with the invention, beam forming means forms the millimeter waves produced by the millimeter wave generator 1 into narrow beams which feed the antenna for distance transmission. The beam forming means includes a beam collector area 15 at the output of the interaction cavity 14 as seen in FIG. 1. Furthermore, antenna means such as, for example, an output waveguide, window 16 (see FIG. 1), is coupled to the beam forming means 17, and functions to direct narrow beams of the millimeter waves to selected targets, whereby said beams damage electronic equipment at said targets. In accordance with the invention, the various parameters, including dimensions and configurations, of the components 14, 15 and 16, are set to form narrow beams at the output window 16. These components function together as a narrow RF beam forming unit 17 (FIG. 1) which produces an RF output which is directed to the antenna (as identified in FIG. 1 with a ray defined as "RF OUTPUT TO ANTENNA").

The millimeter wave generator 1 produces frequencies ranging from about 100 to 140 GHz, 20 millisecond megawatt pulses, or 400 kilowatts CW.

The device of the invention produces enormous RF power levels into narrow beams for applications in the electronic warfare arena. FIG. 3 shows a gyrotron 20 of any suitable known type producing 400 kw at 100 GHz coupled to a 30 inch 52 dB gain antenna 21 producing a one-quarter degree damaging high power microwave beam with an ERP of almost 50 gigawatts. The gyrotron 20 is powered by a high voltage power supply 22. The antenna 21 comprises a parabolic primary reflector 23 and a hyperbolic secondary reflector 24. At a range of 1 kilometer, the beam has a diameter of 8.8 meters and a power density of about 6 kilowatts per square meter. At a range of 2 kilometers, the power density drops by about 6 dB, to about 1.5 kw per square meter. Attenuation which results from atmospheric losses is not a significant factor at output frequencies referred to as GHz atmospheric.

More particularly, FIG. 4 shows the corresponding design/performance relationship between characteristic features of the present invention. The large area provided by the present invention antenna, which is approximately two orders of magnitude larger than that of a standard klystron or TWT correspondingly provides for a two orders or magnitude increase in the power output of the device. In addition, as the magnetic field is proportional to the frequency of the emitted beam, above 60 gigahertz superconducting magnets are required in order to maintain performance levels.

FIG. 5 shows a table of performance characteristics of commercially available high power pulsed and continuous wattage gyrotrons. More particularly, the performance characteristics of a variety of potential gyrotrons which are commercially available are shown, having been arranged with respect to the frequency of the emitted signal. Those gyrotrons which are pulse type are catalogued with their corresponding power rating (in kilowatts) and the length of the pulses produced. The continuous wattage (CW) gyrotrons, as they have no characteristic pulse length, are shown with corresponding power ratings (in kiloWatts) only.

The device of the invention contains an antenna that insures safety of friendly personnel and equipment. In addition, the high power millimeter wave radiation, high voltages and relativistic electrons also can generate high energy X-rays. X-ray control and shielding is part of the device. The antenna beam sidelobes and reflections do not radiate in undesired directions. At millimeter wave frequencies and narrow beams, the significant sidelobes lie within a few degrees of the main beam. Absorbing materials are employed around the radiator to prevent any undesired radiation. Human safety is not different from that experienced with gun systems where safety of personnel is an important parameter. The efficient coupling of high order RF propagation modes of the gyrotron to the antenna in order to form the narrow beams is accomplished by aspheric millimeter wave optics.

Since electronic equipment is not designed to operate under a heavy dose of RF radiation, as in heavy duty microwave ovens, the effects of the invention on electronic equipment would be devastating. The device of the invention could destroy the front ends of any radar, missile seeker, satellite equipment, or microwave receiver. It would also be effective against non-receiving electronic equipment such as digital equipment microprocessors or computer modems.

Beyond 10 km, the power density drops to about 20 watts per square meter, which is insufficient to cause physical damage to electronics. It is, however, still a very high ERP for jamming. The millimeter wave power can be modulated with ECM waveforms to defeat any microwave radar including monopulse. The effective range of the jammer can extend out to 25 km, or more.

Shielding against millimeter waves is difficult, because of their very short wavelengths. Millimeter waves can get into cabinets and enclosures via screens, vents, display panels, or even open connectors. High damaging voltages would be induced even in very short wires such as on integrated circuit pins, internal bond wires, lands and terminals. Damage to typical shielded equipment would range from physical burnout of components, to altering the data in memories and registers, permanently stopping or inhibiting the operation.

The device of the invention would also be effective against infrared equipment, such as IR missile seekers, thermal sights and low light level optical apparatus. At closer range it can also stop modern vehicles employing electronic engine control and ignition systems.

The method of the invention of damaging electronic equipment comprises the steps of producing very high power millimeter waves, forming the millimeter waves into narrow beams for distance transmission, and directing narrow beams of the millimeter waves at selected targets, whereby the beams damage electronic equipment of the targets.

The millimeter waves are produced at frequencies ranging from about 100 to 140 GHz, at 20 millisecond megawatt pulses and 400 kilowatts CW.

While only a single embodiment of the present invention has been shown and described, it is to be understood that many changes and modifications may be made thereunto without departing from the spirit and scope of the invention as defined in the appended claims.

What is claimed is:

1. A device for producing very high power millimeter wave beams, said device comprising:

an electron gun type millimeter wave generating means for producing RF power;

beam forming means, coupled to said wave generating means for forming said RF power into narrow axial beams; and antenna means, having a primary and a secondary reflector, coupled to said beam forming means for receiving and redirecting said narrow axial beams, and for transmitting unfocused substantially parallel narrow axial beams substantially parallel narrow axial beams to selected targets located at remote distances from said device, said selected targets being encompassed by said unfocused substantially parallel narrow axial beams.

2. A device as claimed in claim 1, wherein said electron gun type millimeter wave generating means comprises a gyrotron oscillator.

3. A device as claimed in claim 2, wherein said beam forming means is incorporated in said gyrotron oscillator.

4. The device of claim 1 wherein said primary reflector is a parabolic reflector and said secondary reflector is a hyperbolic reflector, said secondary reflector receiving and redirecting the unfocused substantially parallel narrow axial beams from said beam forming means to said primary reflector for transmission to said selected targets.

5. A device for damaging electronic equipment, said device comprising:

an electron gun type millimeter wave generator for producing very high power millimeter waves;

beam forming means, coupled to said wave generator, for forming said millimeter waves into narrow axial beams;

antenna means, having a primary and a secondary reflector, coupled to said beam forming means for receiving and redirecting said narrow axial beams, and for transmitting unfocused substantially parallel narrow axial beams to selected targets encompassed by said unfocused substantially parallel narrow axial beams at sufficient power density to damage electronic equipment located at said selected targets, said selected targets being located at remote distances from said device.

6. A device as claimed in claim 5, wherein said electron gun type millimeter wave generator means comprises a gyrotron oscillator.

7. A device as claimed in claim 6, wherein said gyrotron oscillator produces frequencies ranging from about 100 to 140 GHz.

8. A device as claimed in claim 7, wherein said gyrotron oscillator produces said frequencies at 20 millisecond megawatt pulses.

9. A device as claimed in claim 8, wherein said gyrotron oscillator produces said frequencies at 400 kilowatts CW.

10. A device as claimed in claim 6, wherein said beam forming means is integrated with the antenna means in said gyrotron oscillator.

11. The device of claim 5 wherein said primary reflector is a parabolic reflector and said secondary reflector is a hyperbolic reflector said secondary reflector receiving and redirecting the unfocused substantially parallel narrow axial beams from said beam forming means to said primary reflector for transmission to said selected targets.

12. A method of damaging electronic equipment, said method comprising the steps of:

producing very high power millimeter waves;

forming said millimeter waves into narrow axial beams for transmission of said narrow axial beams; and redirecting said narrow axial beams of said millimeter waves through an antenna having a primary and a secondary reflector and transmitting unfocused substantially parallel narrow axial beams at selected targets encompassed by said unfocused substantially parallel narrow axial beams, whereby said unfocused substantially parallel beams damage electronic equipment at said selected targets located at remote distances from said antenna.

13. A method as claimed in claim 12, wherein said step of producing very high power millimeter waves produces said millimeter waves at frequencies ranging from 100 to 140 GHz.

14. A method as claimed in claim 13, wherein said step of producing said millimeter waves produces said millimeter waves in 20 millisecond megawatt pulses.

15. A method as claimed in claim 13, wherein said step of producing said millimeter waves produces said millimeter waves as 400 kilowatt continuous wattage output.

16. The method of claim 12 wherein said unfocused substantially parallel narrow axial beams are directed to said secondary reflector which is a hyperbolic reflector, redirected by said hyperbolic reflector to said primary reflector which is a parabolic reflector and transmitted at said selected targets.

* * * * *